United States Patent
Borrelli et al.

(10) Patent No.: US 10,981,825 B2
(45) Date of Patent: Apr. 20, 2021

(54) ANTIMICROBIAL ARTICLES WITH SILVER-CONTAINING ALKALI SILICATE COATING AND METHODS OF MAKING THEREOF

(71) Applicant: CORNING INCORPORATED, Corning, NY (US)

(72) Inventors: Nicholas Francis Borrelli, Elmira, NY (US); Wageesha Senaratne, Horseheads, NY (US); Ying Wei, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 103 days.

(21) Appl. No.: 16/508,736

(22) Filed: Jul. 11, 2019

(65) Prior Publication Data

US 2019/0330099 A1    Oct. 31, 2019

Related U.S. Application Data

(62) Division of application No. 15/305,155, filed as application No. PCT/US2015/027038 on Apr. 22, 2015, now Pat. No. 10,364,181.

(60) Provisional application No. 61/983,035, filed on Apr. 23, 2014.

(51) Int. Cl.
C03C 17/25 (2006.01)
C03C 21/00 (2006.01)
C04B 41/50 (2006.01)

(52) U.S. Cl.
CPC ............ *C03C 17/25* (2013.01); *C03C 21/002* (2013.01); *C03C 2204/02* (2013.01); *C03C 2217/23* (2013.01); *C03C 2217/425* (2013.01); *C03C 2218/111* (2013.01); *C03C 2218/113* (2013.01); *C03C 2218/32* (2013.01); *C04B 41/5024* (2013.01)

(58) Field of Classification Search
None
See application file for complete search history.

(56) References Cited

U.S. PATENT DOCUMENTS

| | | |
|---|---|---|
| 6,170,564 B1 | 1/2001 | Steele |
| 7,232,777 B1 | 6/2007 | Van Hyning |
| 7,763,362 B2 | 7/2010 | Jablonski et al. |
| 8,034,732 B2 | 10/2011 | Kobayashi et al. |
| 8,753,744 B2 | 6/2014 | Borrelli et al. |
| 2008/0045491 A1 | 2/2008 | Fitchmun |
| 2008/0063728 A1 | 3/2008 | Fechner et al. |
| 2009/0142568 A1 | 6/2009 | Dejneka et al. |
| 2010/0062032 A1 | 3/2010 | Sharma |
| 2012/0034435 A1 | 2/2012 | Borrelli et al. |
| 2012/0040193 A1 | 2/2012 | Rajala |
| 2015/0307392 A1 | 10/2015 | Castle et al. |
| 2016/0017155 A1 | 1/2016 | Baldi et al. |

FOREIGN PATENT DOCUMENTS

| | | | |
|---|---|---|---|
| CA | 2734864 A1 | | 2/2010 |
| CN | 1839099 A | | 9/2006 |
| CN | 101045609 A | | 10/2007 |
| CN | 101766839 A | | 7/2010 |
| CN | 102533112 A | | 7/2012 |
| DE | 202005006784 U1 | | 10/2005 |
| EP | 1270527 A1 | | 1/2003 |
| EP | 1975132 A1 | | 10/2008 |
| JP | 08157315 A | | 6/1996 |
| JP | 2000053451 A | | 2/2000 |
| JP | 2001026466 A | | 1/2001 |
| JP | 2005022916 A | | 1/2005 |
| JP | 2010138025 A | | 6/2010 |
| JP | 2010235397 A | * | 10/2010 |
| JP | 4916503 B2 | | 4/2012 |
| KR | 20050116474 A | * | 12/2005 |
| WO | 0214233 A1 | | 2/2002 |
| WO | 03056924 A1 | | 7/2003 |
| WO | 2006058906 A1 | | 6/2006 |
| WO | 2007068140 A1 | | 6/2007 |
| WO | 2012135294 A2 | | 10/2012 |

OTHER PUBLICATIONS

English Translation of CN201580021449.9 Office Action dated May 11, 2020; 7 Pages; Chinese Patent Office.
Yuan et al; "Color Glasses"; Light Indus "Color Glasses" Try Press, pp. 9-11 (1987).
Xin; "Modern Optical Manufacturing Technology"; National Defense Industry Press, pp. 193-194(1997).
Araujo et al; "Ion Exchange Equilibria Between Glass and Molten Salts" ; Journal of Non-Crystalline Solids; 318 (2003) 262-267.
Chaw et al; "Role of Silver Ions in Destabilization of Intermolecular Adhesion Forces Measured by Atomic Force Microscopy in *Staphylococcus epidermidis* Biofilms" ; Antimicrob. Agents Chemother., 2005; 49 (12) p. 4853-4859.
English Translation of CN201580021449.9 Office Action dated July 4, 2018; 12 Pages; Chinese Patent Office.
Feng et al; "A Mechanistic Study of the Antibacterial Effect of Silver Ions on *Escherichia coli* and *Staphylococcus aureus*" ; Journal of Biomedical; 2000; 7 Pages.

(Continued)

*Primary Examiner* — David Sample

(57) ABSTRACT

An antimicrobial article having a substrate, and a coating on a surface of the substrate. The coating includes a silver-containing alkali silicate. The antimicrobial article has an antimicrobial efficacy of greater than or equal to about 90.0% according to EPA Test Method for Efficacy of Copper Alloy Surfaces as a Sanitizer. The coating may further include at least one of a boron-containing compound and an aluminum-containing compound. A method for forming antimicrobial articles includes coating a substrate with a mixture comprising an alkali silicate; curing the coating at a temperature from greater than or equal to about 300° C. to less than or equal to about 620° C. for a duration of greater than or equal to about 15 minutes to less than or equal to about 120 minutes; and contacting the coating with an antimicrobial medium comprising silver nitrate and an alkali nitrate.

6 Claims, 2 Drawing Sheets

(56) References Cited

OTHER PUBLICATIONS

Hinton et al; "Comparison of the Antibacterial Activity of Chelating Agents Using the Agar Diffusion Method"; International Journal of Poultry Science; 9 (11) 1023-1026; 2010.

International Search Report of the International Searching Authority; PCT/US2015/027038; dated Aug. 5, 2015; 4 Pages; European Patent Office.

Jung et al; "Antibacterial Activity and Mechanism of Action of the Silver Ion in Staphylococcus aureus and Escherichia coli"; Applied and Environmental Microbiology; Apr. 2008; p. 2171-2174, vol. 74, No. 7.

Knetsch et al; "New Strategies in the Development of Antimicrobial Coatings: The Example of Increasing Usage of Silver and Silver Nanoparticles"; Polymers, 2011, 3, 340-366.

Lv et al; "Antibiotic Glass Slide Coated With Silver Nanoparticles and Its Antimicrobial Capabilities"; Polymers for Advanced Technologies, vol. 19 (2008), p. 1455-1460.

Matsumura et al; "Mode of Bactericidal Action of Silver Zeolite and Its Comparison With That of Silver Nitrate"; Applied and Environmental Microbiology, Jul. 2003; p. 4278-4281, vol. 69, No. 7.

Nunzio et al., "Silver Containing Bioactive Glasses Prepared by Molten Salt Ion-Exchange"; J. European Ceramic Society vol. 24 (2004), p. 2935-2942.

Park et al; "Silver-Ion-Mediated Reactive Oxygen Species Generation Affecting Bactericidal Activity"; Water Research; 43 (2009) 1027-1032.

Temitayo et al; "Structural and Antimicrobial Studies of Coordination Compounds of Phenylalanine of Glycine"; International Journal of Chemistry; vol. 4, No. 2 Apr. 2012; 11 Pages.

Verne et al, "Surface Silver-Doping of Biocompatible Glass to Induce Antibacterial Properties: Part I: Massive Glass"; J. Material Science; Materials Medicine vol. 20 (2009), pp. 733-740.

CN201580021449.9 Second Office Action dated Mar. 4, 2019, 9 Pages; China Patent Office.

* cited by examiner

ANTIMICROBIAL ARTICLES WITH SILVER-CONTAINING ALKALI SILICATE COATING AND METHODS OF MAKING THEREOF

CROSS-REFERENCE TO RELATED APPLICATIONS

This application is a divisional of U.S. patent application Ser. No. 15/305,155 filed on Oct. 19, 2016, which claims the benefit of priority under 35 U.S.C. § 119 of U.S. Provisional Application Ser. No. 61/983,035, filed on Apr. 23, 2014, the content of which is relied upon and incorporated herein by reference in its entirety

BACKGROUND

The present disclosure is directed to articles having antimicrobial efficacy and methods of making such articles. In particular, the disclosure is directed to an article with antimicrobial properties having a silver-containing sodium, potassium or lithium silicate coating on a substrate.

Recently, the use of both metallic silver particles and silver salts have been described in the patent and technical literature as a means for imparting antimicrobial properties to a variety of materials. Silver ions interact with a wide range of molecular processes within microorganisms resulting in a range of effects from inhibition of growth and loss of infectivity to cell death (cytotoxicity).

The prevalence of "touch screens" in contemporary society gives rise to many surfaces that can harbor microbes, bacteria, and viruses, and these microbes can be transferred from person to person. Accordingly, a need exists for an article that has improved antimicrobial properties.

SUMMARY

In embodiments, an antimicrobial article comprises: a substrate and a coating on a surface of the substrate. The coating comprises a silver-containing alkali silicate. The antimicrobial article has an antimicrobial efficacy of greater than or equal to about 90.0% according to EPA Test Method for Efficacy of Copper Alloy Surfaces as a Sanitizer.

In embodiments, an antimicrobial article comprises: a substrate and a coating on a surface of the substrate. The coating comprises at least one of a silver-containing alkali aluminosilicate and a silver-containing alkali borosilicate, and the antimicrobial article has an antimicrobial efficacy of greater than or equal to about 90.0% according to EPA Test Method for Efficacy of Copper Alloy Surfaces as a Sanitizer.

In one or more embodiments, the substrate may be transparent or opaque, and may include an amorphous substrate (e.g., soda lime glass, alkali aluminosilicate glass, alkali containing borosilicate glass and/or alkali aluminoborosilicate glass), a crystalline substrate (e.g., single crystal substrates such as sapphire and/or glass-ceramic substrates) or a combination thereof. The substrate may be strengthened (by, for example, chemical processes such as ion exchange processes) or non-strengthened.

In embodiments, a method for producing an antimicrobial article comprises: coating a substrate with a mixture comprising an alkali silicate; curing the coating at a temperature from greater than or equal to about 300° C. to less than or equal to about 620° C. for a duration of greater than or equal to about 15 minutes to less than or equal to about 120 minutes; and contacting the coating with an antimicrobial medium comprising silver nitrate and an alkali nitrate.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
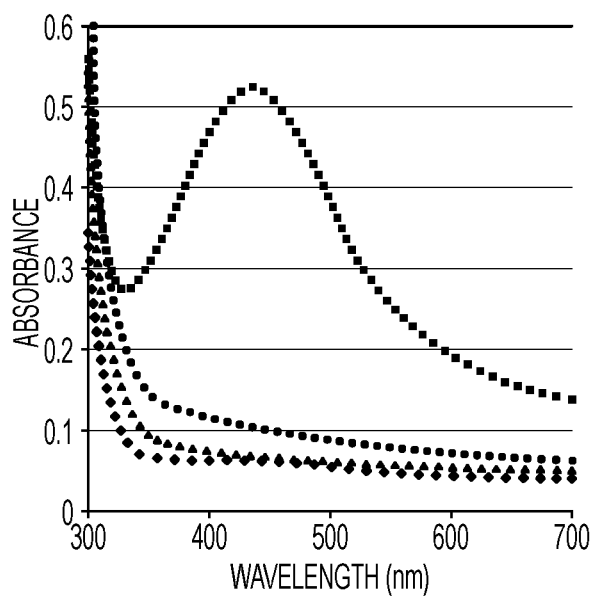
FIG. 1 is a graph showing light absorbance of articles having silver-containing alkali silicate coatings according to embodiments disclosed herein.

Embodiments disclosed herein are directed to antimicrobial articles having silver-containing alkali silicate coatings with antimicrobial efficacy and methods for making such antimicrobial articles. In embodiments, an antimicrobial article comprises a substrate and a coating on a surface of the substrate. The coating comprises a silver-containing alkali silicate, and the antimicrobial article has an antimicrobial efficacy of greater than or equal to about 90.0% according to EPA Test Method for Efficacy of Copper Alloy Surfaces as a Sanitizer. In embodiments, the silver-containing alkali silicate coating is a silver-containing alkali borosilicate or a silver-containing alkali aluminosilicate. Methods for making such articles are also disclosed in embodiments.

General compositions of glass bodies that may be used as substrates are described herein below; however, it should be understood that the substrates may be formed from any one of a variety of glass compositions including, without limitation, aluminosilicate glasses, borosilicate glasses, and the like. In one or more embodiments, the substrate may be transparent or opaque, and may include an amorphous substrate (e.g., soda lime glass, alkali aluminosilicate glass, alkali containing borosilicate glass and/or alkali aluminoborosilicate glass), a crystalline substrate (e.g., single crystal substrates such as sapphire and/or glass-ceramic substrates) or a combination thereof. The substrate may be strengthened (by, for example, chemical processes such as ion exchange processes) or non-strengthened. Accordingly, the glass compositions for the substrates described below are exemplary only and do not limit the composition of the substrate.

Where the substrate includes a crystalline substrate, the substrate may include a single crystal, which may include $Al_2O_3$. Such single crystal substrates are referred to as sapphire. Other suitable materials for a crystalline substrate include polycrystalline alumina layer and/or or a spinel ($MgAl_2O_4$).

Optionally, the crystalline substrate may include a glass ceramic substrate, which may be strengthened or non-strengthened. Examples of suitable glass ceramics may include $Li_2O$—$Al_2O_3$—$SiO_2$ system (i.e. LAS-System) glass ceramics, $MgO$—$Al_2O_3$—$SiO_2$ System (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the glass substrate strengthening processes disclosed herein. In one or more embodiments, MAS-System glass ceramic substrates may be strengthened in $Li_2SO_4$ molten salt, whereby $2Li^+$ for $Mg^{2+}$ exchange can occur.

In an exemplary glass substrate, $SiO_2$ is the largest constituent and, as such, $SiO_2$ is the primary constituent of the glass network formed from the glass composition. Pure $SiO_2$ has a relatively low CTE. However, pure $SiO_2$ has a high melting point. Accordingly, if the concentration of $SiO_2$ in the glass composition is too high, the formability of the glass composition can be diminished as higher concentrations of $SiO_2$ increase the difficulty of melting the glass, which, in turn, adversely impacts the formability of the glass. Low $SiO_2$ glasses, such as, for example, glass with less than about 50 mol. % $SiO_2$, tend to have poor durability and resistance to devitrification, so it is practical to have more than about 50 mol. % $SiO_2$ for ease of forming.

In embodiments, the glass composition can comprise $SiO_2$ in a concentration from greater than or equal to about 50 mol. % to less than or equal to about 80 mol. %, such as from greater than or equal to about 55 mol. % to less than or equal to about 75 mol. %.

The glass composition of various embodiments can further comprise $Al_2O_3$ in addition to $SiO_2$. $Al_2O_3$ can serve as a glass network former, similar to $SiO_2$. $Al_2O_3$ can increase the viscosity of the glass composition. $Al_2O_3$ can also reduce the liquidus temperature of the glass melt, thereby enhancing the liquidus viscosity and improving the compatibility of the glass composition with certain forming processes. In addition, $Al_2O_3$ can enhance the ion exchange performance of alkali silicate glasses. In embodiments, the glass composition can comprise $Al_2O_3$ in a concentration from greater than or equal to about 5 mol. % to less than or equal to about 25 mol. %.

Alkali metal oxides (hereinafter referred to as "$R_2O$" where "R" is one or more alkali metals) may be added to lower the viscosity of a glass to improve the meltability and the formability thereof. In addition, alkali metal oxides may also enable ion exchange. When the content of $R_2O$ is too large, the thermal expansion coefficient of the glass becomes too large, and the thermal shock resistance of the glass may decrease. In embodiments, the glass composition may include one or more of $Li_2O$, $Na_2O$, $K_2O$, $Rb_2O$, and $Cs_2O$ as an alkali metal oxide. In embodiments, the glass composition can comprise $R_2O$ in a concentration from greater than or equal to about 5 mol. % to less than or equal to about 25 mol.

The glass composition can, in some embodiments, contain other elements, such as alkaline earth metal oxides. In embodiments, the alkaline earth metal oxides can be selected from MgO, CaO, SrO, BaO, and combinations thereof. These oxides can be added to increase meltability, durability, and glass stability. In addition, alkaline earth metal oxides can be added as stabilizers that help prevent degradation of the glass composition upon exposure to environmental conditions. While ZnO is not an alkaline earth, it is a divalent oxide and serves a similar function as the above referenced alkaline earth metal oxides and, thus, ZnO can be added to the glass composition to enhance the same properties as alkaline earth metal oxides. However, adding too much alkaline earth metal oxide and/or ZnO to the glass composition can decrease its formability. In embodiments, the glass composition comprises alkaline earth metal oxide in concentrations from greater than or equal to 0.0 mol. % to less than or equal to about 5.0 mol %. Similarly, in embodiments, the glass composition comprises ZnO in concentrations from greater than or equal to 0.0 mol. % to less than or equal to about 5.0 mol %. In embodiments, the glass composition can comprise fining agents, such as, for example, $SnO_2$, sulfates, chlorides, bromides, $Sb_2O_3$, $As_2O_3$, and $Ce_2O_3$. In embodiments, the glass composition can comprise fining agents in concentrations from greater than or equal to 0.0 mol. % to less than or equal to about 1.0 mol. %.

Glasses according to embodiments disclosed herein may be formed into articles, such as, for example, glass sheets. In embodiments, the glass composition has a liquidus viscosity of at least 130 kilopoise and is down-drawable by suitable techniques, for example, but not limited to, fusion-draw processes, slot-draw processes, and re-draw processes. In other embodiments the glass sheet can be made by the float process. Three dimensional articles may be made by, for example, molding, blow molding, and the like.

The substrates, such as the glass compositions described above, may be formed into sheets having any thickness. For example, for embodiments used in electronic devices such as touch screens or touch screen cover glasses for cell phones, computers (including laptops and tablets) and ATMs, the substrate may have a thickness in the range of 0.2 mm to 3 mm. In other embodiments the substrate may have a thickness in the range of 0.2 mm to 2.0 mm. In further embodiments, the substrate may have a thickness in the range of 0.3 mm to 0.7 mm. Other applications of substrates according to embodiments include use as table tops or cover tops, shelving in refrigerators or for storage shelves or shelf covers in, for example, laboratories, hospitals and other facilities where antimicrobial properties are desired. It should be noted that the substrate may be thicker according to the intended use. For example, for a hospital bench top or bench top cover, it may be desirable that the glass have a thickness of greater than 3 mm.

According to some embodiments, the substrate may be a glass substrate and may be strengthened, such as, for example, by physical and/or chemical tempering. Some embodiments include strengthening the glass substrate using a strengthening medium containing an ion-exchanging alkali metal compound with ions larger than alkali metal ions in the glass substrate (e.g., exchanging Na ions in the glass substrate for K ions in the strengthening medium). Glass compositions that are amenable to strengthening by ion exchange typically contain smaller monovalent alkali metal ions, such as, for example, Na and/or Li ions, that can be exchanged by larger monovalent ions, such as, for example, K, Rb, and Cs ions. Exemplary glass compositions that are amenable to strengthening by ion exchange are discussed above.

Upon exposure of the glass substrate to the strengthening medium, the larger alkali metal ions in the strengthening medium are exchanged into the glass substrate to form a glass substrate having a compressive stress. In embodiments, the glass substrate may be exposed to the strengthening medium for a time greater than or equal to about 20 minutes at a temperature from greater than or equal to about 300° C. to less than or equal to about 500° C. In some embodiments, the glass substrate may be exposed to the strengthening medium at a temperature of from greater than or equal to about 350° C. to less than or equal to about 450° C. and for a duration of from greater than or equal to about 40 minutes to less than or equal to about 20 hours, such as from greater than or equal to about 1.0 hour to less than or equal to about 5 hours.

In some embodiments, the strengthening medium can have the viscosity of a gel or a paste, but in other embodiments the strengthening medium may be a liquid, such as a molten salt bath. According to embodiments, the strengthening medium may include one or more of $NaNO_3$ and $KNO_3$. Suitable strengthening processes are disclosed in U.S. Pat. No. 5,674,790, which is herein incorporated by reference in its entirety.

In embodiments, the depth of a compressive stress layer formed by the strengthening method may be from greater than or equal to about 20 μm to less than or equal to about 100 μm, such as from greater than or equal to about 25 μm to less than or equal to about 60 μm. In embodiments, the compressive stress of the glass substrate formed by the strengthening method may be greater than or equal to about 200 MPa, such as greater than or equal to about 300 MPa. In other embodiments, the compressive stress of the glass substrate formed by the strengthening method may be greater than or equal to about 400 MPa, such as greater than or equal to about 500 MPa. In still other embodiments, the compressive stress of the glass substrate formed by the strengthening method may be greater than or equal to about 600 MPa, such as greater than or equal to about 700 MPa. In embodiments, the compressive stress of the glass substrate formed by the strengthening method may be less than or equal to about 1100 MPa.

Embodiments include a silver-containing alkali silicate coating on the substrate to impart antimicrobial properties to the substrate. For example, in many touch screen applications (phones, computers, ATMs, etc.) where a glass substrate is used as a cover glass, a coating is placed on the glass substrate surface. In some embodiments, the silver-containing alkali silicate coating is selected from silver-containing sodium silicate, potassium silicate, and/or lithium silicate. In some embodiments, the alkali silicate coating further comprises aluminum or boron, and is a silver-containing alkali aluminosilicate coating or a silver-containing alkali borosilicate coating. In some embodiments, the coating is a silver-containing sodium aluminosilicate, potassium aluminosilicate, lithium aluminosilicate, sodium borosilicate, potassium borosilicate, or lithium borosilicate.

In embodiments, the coating comprises a composition containing silica, alkali oxide and water, where the total wt. % alkali silicate comprises the wt. % of silica and alkali oxide. The coating is prepared from a solution having greater than or equal to about 0.1 wt. % alkali silicate to less than or equal to about 10.0 wt. % alkali silicate, such as from greater than or equal to about 1.0 wt. % alkali silicate to less than or equal to about 9.0 wt. % alkali silicate. In other embodiments, the coating comprises from greater than or equal to about 3.0 wt. % alkali silicate to less than or equal to about 8.0 wt. % alkali silicate, such as from greater than or equal to about 4.0 wt. % alkali silicate to less than or equal to about 7.0 wt. % alkali silicate. In yet other embodiments, the coating comprises from greater than or equal to about 5.0 wt. % alkali silicate to less than or equal to about 6.0 wt. % alkali silicate. The remainder of the coating solution comprises a delivery vehicle, such as, for example, water, that allows the alkali silicate to be dissolved in the coating solution and be deposited on the substrate as a thin film. In embodiments, the ratio of silica:alkali oxide may be from greater than or equal to about 1.0 to less than or equal to about 50, such as from greater than or equal to about 1.0 to less than or equal to about 40. In other embodiments, the ratio of silica:alkali oxide may be from greater than or equal to about 1.0 to less than or equal to about 35, such as from greater than or equal to about 1.0 to less than or equal to about 30. In yet other embodiments, the ratio of silica:alkali oxide may be from greater than or equal to about 1.0 to less than or equal to about 25, such as from greater than or equal to about 1.0 to less than or equal to about 20. In still other embodiments, the ratio of silica:alkali oxide may be from greater than or equal to about 2.0 to less than or equal to about 4.0, such as from greater than or equal to about 3.0 to less than or equal to about 3.5. In some embodiments, the ratio of silica:alkali oxide may be about 3.4.

In embodiments, the alkali oxide in the coating may be selected from sodium oxide, potassium oxide, and/or lithium oxide. However, it should be understood that other alkali oxides may be used to form the silver-containing alkali silicate coating.

In embodiments, the substrate is coated with the alkali silicate, alkali aluminosilicate, or alkali borosilicate. The coating may be formed by any suitable method and may be applied to the substrate by any suitable method. For example, the coating may be applied to the substrate by spray coating, dip coating, roll coating, spin coating, or vapor deposition. This coating may then be cured by exposing the coating to an energy source, such as, for example, by heating the coating in an oven or with infrared radiation source. In embodiments, the coating may be cured at a temperature from greater than or equal to about 300° C. to less than or equal to about 620° C., such as at a temperature of from greater than or equal to about 325° C. to less than or equal to about 600° C. In other embodiments, the coating may be cured at a temperature from greater than or equal to about 350° C. to less than or equal to about 575° C., such as at a temperature of from greater than or equal to about 375° C. to less than or equal to about 550° C. In yet other embodiments, the coating may be cured at a temperature from greater than or equal to about 400° C. to less than or equal to about 525° C., such as at a temperature of from about 425° C. to less than or equal to about 500° C. In embodiments, the coating may be cured at a temperature of about 430° C. The duration of the curing process may be, in embodiments, from greater than or equal to about 15 minutes to less than or equal to about 120 minutes, such as from greater than or equal to about 30 minutes to less than or equal to about 90 minutes. In other embodiments, the duration of the curing process may be from greater than or equal to about 45 minutes to less than or equal to about 60 minutes. In embodiments, and without being limited to any particular theory, curing may cause a condensation of Si—OH groups in the silicate network, and some Si—OH may also bond to surface silanols.

In embodiments, the cured alkali silicate coating undergoes an antimicrobial treatment. Embodiments of the antimicrobial treatment may comprise contacting the alkali silicate coating with an antimicrobial medium that comprises silver ions. The antimicrobial medium may be contacted with the alkali silicate coating by any suitable means, including, in some embodiments, spray coating, dip coating, roll coating, spin coating, or vapor deposition. During the antimicrobial treatment, larger silver ions in the antimicrobial medium are exchanged for smaller ions in the alkali silicate coating, such as, for example, sodium ions, potassium ions, and/or lithium ions. According to embodiments, the antimicrobial medium is molten silver nitrate or an aqueous solution comprising silver nitrate. In some embodiments, the antimicrobial medium is an aqueous mixture comprising silver nitrate and one or more alkali nitrates, such as, for example, potassium nitrate and/or sodium nitrate. In other embodiments, the antimicrobial medium is a molten salt of silver nitrate and one or more alkali nitrate, such as, for example, potassium nitrate and/or sodium nitrate.

In some embodiments, the antimicrobial medium may include molten salt baths, where bath concentrations range from greater than or equal to about 0.01 wt. % to less than or equal to 100 wt. % Ag-containing compounds (e.g., $AgNO_3$), such as from greater than or equal to about 0.1 wt. % to less than or equal to about 90 wt. % Ag-containing compounds. In other embodiments, the antimicrobial medium may include from greater than or equal to about 1.0 wt. % to less than or equal to 85 wt. % Ag-containing compounds, such as from greater than or equal to about 5.0 wt. % to less than or equal to about 80 wt. % Ag-containing compounds. In yet other embodiments, the antimicrobial medium may include from greater than or equal to about 10 wt. % to less than or equal to 75 wt. % Ag-containing compounds, such as from greater than or equal to about 50 mol. % to less than or equal to about 70 wt. % Ag-containing compounds. In embodiments the Ag-containing compounds are $AgNO_3$, and the remainder of the ion-exchange bath composition is one or more alkali metal compounds, such as, for example, $KNO_3$ and/or $NaNO_3$.

In embodiments, the duration of the antimicrobial treatment using the silver-containing antimicrobial medium is from greater than or equal to about 1.0 minute to less than or equal to about 360 minutes. In other embodiments, the duration of the antimicrobial treatment is from greater than or equal to about 5.0 minutes to less than or equal to about 120 minutes, such as from greater than or equal to about 10 minutes to less than or equal to about 90 minutes. In embodiments, the antimicrobial treatment is carried out at a temperature from greater than or equal to about 50° C. to less than or equal to about 490° C., such as at a temperature from greater than or equal to about 100° C. to less than or equal to about 450° C. In other embodiments, the antimicrobial treatment is carried out at a temperature from greater than or equal to about 85° C. to less than or equal to about 425° C., such as at a temperature from greater than or equal to about 150° C. to less than or equal to about 400° C. In yet other embodiments, the antimicrobial treatment is carried out at a temperature from greater than or equal to about 175° C. to less than or equal to about 375° C., such as at a temperature from greater than or equal to about 200° C. to less than or equal to about 350° C.

Increasing the amount of silver ions in the silicate coating provides antimicrobial properties to the article. As used herein the term "antimicrobial," means that an agent or material, or a surface containing the agent or material, may kill or inhibit the growth of microbes from at least two of the families consisting of bacteria, viruses, and fungi. The term as used herein does not mean it will kill or inhibit the growth of all microbe species within such families, but that it will kill or inhibit the growth of one or more species of microbes from such families.

Articles according to this disclosure have antimicrobial activity at ambient conditions, such as, for example, about 23° C. and about 40% relative humidity. The antimicrobial activity of articles according to embodiments measured at room temperature (i.e., about 23° C.) and low relative humidity (i.e., about 40%) are measured according to the "EPA Test Method for Efficacy of Copper Alloy Surfaces as a Sanitizer." In the EPA testing methodology, the antimicrobial efficacy is measured by the percentage reduction in microbes (e.g., bacteria, viruses, and fungi) between a control sample and a test sample. For example, a test article comprising a substrate having a silver-containing alkali silicate coating may kill 90.0% of microbes present in a control sample that does not include a silver-containing alkali silicate and, thus, the test article would have an antimicrobial efficacy of 90.0%. In some embodiments, the antimicrobial article has an antimicrobial efficacy of greater than or equal to about 90.0%, such as greater than or equal to about 92.0%. In other embodiments, the antimicrobial article has an antimicrobial efficacy of greater than or equal to about 94.0%, such as greater than or equal to about 95.0%. In yet other embodiments, the antimicrobial article has an antimicrobial efficacy of greater than or equal to about 97.0%, such as greater than or equal to about 99.0%. In still other embodiments, the antimicrobial article has an antimicrobial efficacy of greater than or equal to about 99.9%.

Increasing the amount of silver in the antimicrobial coating improves the antimicrobial efficacy of the article. However, the presence of silver may also cause the article to become discolored, such as by yellowing the article. Without being bound to any particular theory, it is believed that the reduction of $Ag^+$ ions to $Ag^0$ may lower the transmission of light through the article, and may lead to lower antimicrobial performance and decreased durability of the coating as well. It is further believed that non-bridging oxygen present in the alkali silicate composition may donate electrons to $Ag^+$ ions, thus increasing reduction reactions and the yellowing of the article. Accordingly, in embodiments, the amount of non-bridging oxygen is reduced by increasing the silica:alkali oxide molar ratio, which may form a more stable silicate. In embodiments, the silica:alkali oxide molar ratio is greater than or equal to about 1.0 and less than or equal to about 50, or even from greater than or equal to about 1.0 and less than or equal to about 40. In other embodiments, the silica:alkali oxide molar ratio is greater than or equal to about 3.0, or even greater than or equal to about 3.5. In other embodiments, the silica:alkali oxide molar ratio is greater than or equal to about 4.0, or even greater than or equal to about 4.5. In yet other embodiments, the silica:alkali oxide molar ratio is greater than or equal to about 5.0, or even greater than or equal to about 5.5.

In addition, for a given silica:alkali oxide ratio, one can reduce the alkali content in the alkali silicate coating and increase the silicate crosslinking between silanols, by curing at higher temperature prior to exchange with Ag ion. Accordingly, in some embodiments that include an increased silica:alkali oxide ratio in the silicate coating, the coating is cured at a temperature greater than or equal to about 300° C., or even greater than or equal to about 430° C. In other embodiments, the coating is cured at a temperature greater than or equal to about 450° C., or even greater than or equal to about 500° C. In still other embodiments, the coating is cured at a temperature greater than or equal to about 550° C., or even greater than or equal to about 600° C. In embodiments, the coating is cured at a temperature of less than or equal to about 620° C.

Without being bound by any particular theory, it is believe that by increasing the silica:alkali oxide ratio to be greater than or equal to about 3.0 and curing that coating at temperatures greater than or equal to about 400° C., the amount of non-bridging oxygen in the coating is reduced and, thus, less $Ag^+$, will be reduced. By employing such measures, the transparency of the antimicrobial article, in some embodiments, is greater than or equal to about 80% at wavelengths from 400 nm to 800 nm, such as greater than or equal to about 85% at wavelengths from 400 nm to 800 nm. In other embodiments, the transparency of the antimicrobial article is greater than or equal to about 90% at wavelengths from 400 nm to 800 nm, or even greater than or equal to about 92% at wavelengths from 400 nm to 800 nm.

Another way to reduce the number of non-bridging oxygen in the silicate coating may be to introduce compounds that will bond with the non-bridging oxygen, such as, for example, boron-containing compounds or aluminum-containing compounds. These compounds increase the network connectivity of the silicate, thereby decreasing the number of non-bridging oxygens, but have enough sites for silver to ion-exchange into the silicate coating. Accordingly, in embodiments that include boron-containing compounds, the molar ratio of boron oxide:alkali oxide should be controlled. In embodiments, the boron oxide:alkali oxide molar ratio is greater than or equal to about 0.3, such as greater than or equal to about 0.5. In other embodiments, the boron oxide:alkali oxide molar ratio is greater than or equal to about 0.7, such as greater than or equal to about 1.0. In embodiments including aluminum-containing compounds, the aluminum oxide:alkali oxide molar ratio is greater than or equal to about 1.0, such as greater than or equal to about 1.2. In other embodiments, the aluminum oxide:alkali oxide molar ratio is greater than or equal to about 1.5, such as greater than or equal to about 1.7.

By including aluminum-containing compounds or boron-containing compounds in the silicate coating, it is believed that the amount of non-bridging oxygen in the coating is reduced and, thus, less $Ag^+$ will be reduced. The transparency of the antimicrobial article, in some embodiments, is greater than or equal to about 80% at wavelengths from 400 nm to 800 nm, such as greater than or equal to about 85% at wavelengths from 400 nm to 800 nm. In other embodiments, the transparency of the antimicrobial article is greater than or equal to about 90% at wavelengths from 400 nm to 800 nm, or even greater than or equal to about 92% at wavelengths from 400 nm to 800 nm.

In addition, controlling the thickness of the coating layer may also improve the optical characteristics of antimicrobial articles. The methods and processes for depositing these coatings are capable of controlling the thickness of the silver-containing alkali silicate coating on the surface of the substrate. Such processes and methods may include, for example, spray coating, dip coating, roll coating, spin coating, vapor deposition, or roll coating. In embodiments, the thickness of the coating is from greater than or equal to about 5.0 nm to less than or equal to about 100 nm, such as greater than or equal to about 10 nm to less than or equal to about 75 nm. In other embodiments the thickness of the coating is from greater than or equal to about 25 nm to less than or equal to about 60 nm, such as greater than or equal to about 35 nm to less than or equal to about 50 nm.

Antimicrobial articles according to embodiments may be formed by coating a substrate with an alkali silicate coating. In some embodiments, the alkali silicate coating is applied to the substrate as an aqueous solution. In other embodiments, the alkali silicate coating is applied to the substrate as a powder. In embodiments where the coating comprises boron or aluminum compounds, the boron or aluminum compounds may be added to the alkali silicate solution or powder, such as by mixing boron compounds (e.g., boron oxide, boric acid, sodium tetraborate) or aluminum compounds (e.g., aluminum oxide, aluminum hydroxide) with the alkali silicate solution or powder, before the alkali silicate solution or powder is applied to the substrate. In other embodiments, the boron compounds or aluminum compounds are added after the alkali silicate solution or powder is applied to the substrate. The coating may be cured after all of the components, including the optional boron compounds and aluminum compounds, of the coating have been applied to the article.

In embodiments, the alkali silicate coating may be applied to a glass substrate that may be an unstrengthened glass substrate or a strengthened glass substrate. In embodiments where the alkali silicate coating is applied to a strengthened glass substrate, such as a glass substrate that has been strengthened by an ion-exchange strengthening, the curing of the alkali silicate coating may be conducted at lower temperatures so that the curing process does not affect the properties of the strengthened glass substrate. In embodiments where the alkali silicate coating is applied to a strengthened glass substrate, the temperature of the curing process may be from greater than or equal to about 250° C. to less than or equal to about 400° C., such as at temperatures greater than or equal to about 270° C. to less than or equal to about 380° C. In other embodiments where the alkali silicate coating is applied to a strengthened glass substrate, the temperature of the curing process may be from greater than or equal to about 300° C. to less than or equal to about 350° C. The duration of the curing process may be from about 10 minutes to about 120 minutes, such as about 60 minutes.

Subsequent to curing the alkali silicate coating, optionally including the boron compounds or aluminum compounds, the coated glass substrate may undergo the antimicrobial treatment by exposing the coated glass substrate to the antimicrobial medium. In some embodiments, a strengthening treatment is conducted on the article subsequent to the antimicrobial treatment. The strengthening treatment may include contacting the article with a strengthening medium comprising potassium nitrate and/or sodium nitrate and conducting an ion exchange.

EXAMPLES

Embodiments will be further clarified by the following examples.

Example 1

The samples in Example 1 were used to demonstrate antimicrobial efficacy of articles having a sodium silicate coating. The sodium silicate was prepared from a sodium trisilicate solution manufactured by Sigma Aldrich, such that the total alkali silicate content was 3.5-7.5 wt. % where silica:alkali oxide molar ratio was 2.5. The solution was applied by dip coating to achieve 25-100 nm coating on unstrengthened glass substrates and cured at 300° C. for 60 minutes. As shown in Table 1 below, the coated glass substrates were exposed to various antimicrobial treatments by immersing the coated articles into molten salt baths containing one of a 0.1 wt. %, 5.0 wt. %, and 50 wt. % $AgNO_3/KNO_3$ or $AgNO_3/NaNO_3$ at a temperature of 350° C. for 10 minutes. The antimicrobial properties of the articles were measured using the methodology laid out in the EPA's "Test Method for Efficacy of Copper Alloy Surfaces as a Sanitizer." Results of the test are shown in Table 1:

TABLE 1

| Sample No. | Antimicrobial Treatment using molten salt bath wt/wt % | LCL (95%) | Average Antimicrobial Efficacy | UCL (95%) |
|---|---|---|---|---|
| 1 | 50%/50% AgNO$_3$/KNO$_3$ | 99.7% | 99.7% | 99.8% |
| 2 | 50%/50% AgNO$_3$/NaNO$_3$ | 99.2% | 99.6% | 99.9% |
| 3 | 5.0%/95% AgNO$_3$/KNO$_3$ | 99.9% | 99.9% | 99.9% |
| 4 | 5.0%/95% AgNO$_3$/NaNO$_3$ | 97.6% | 98.4% | 99.3% |
| 5 | 0.1%/99.9% AgNO$_3$/KNO$_3$ | 87.8% | 88.5% | 89.1% |
| 6 | 0.1%/99.9% AgNO$_3$/NaNO$_3$ | 91.9% | 96.3% | 100.0% |

Example 2

The samples in Example 2 were used to demonstrate the antimicrobial efficacy and silver reduction for unstrengthened antimicrobial articles having various sodium silicate or lithium silicate coatings prepared from various sources. The absorbance curves show a plasmon resonance at 420-430 nm (peak at this wavelength). This is an indication of reduced silver. Glass substrates were dip coated in the sodium silicate or lithium silicate as shown in Table 2 below and cured at 300° C. for 60 minutes. The coated and cured glass substrates were then subjected to an antimicrobial treatment by immersing the coated glass substrates in a 50 wt. % AgNO$_3$/KNO$_3$ molten salt bath antimicrobial medium for 5 to 6 minutes at 350° C. The antimicrobial efficacy of the glass substrates was measured using the EPA's "Test Method for Efficacy of Copper Alloy Surfaces as a Sanitizer." The silver reduction in Table 2 indicates a point in time when the Ag$^+$ ions were reduced to Ag$^0$ at ambient conditions (e.g., about 23° C. and 40% relative humidity). Reduced silver was measured using absorbance spectra, where nanoparticle Ag$^0$ shows a distinct peak at 420-430 nm, which is a plasmon resonance band which indicates the presence of reduced silver.

TABLE 2

| Sample No. | Total alkali silicate wt % coating | Molar Ratio SiO$_2$:alkali oxide | Antimicrobial Efficacy | Silver Reduction |
|---|---|---|---|---|
| 7 | 3.5-.7.4% prepared from Sodium Trisilicate (Sigma Aldrich) | 2.5 | 99.7% | 3 days |
| 8 | 3.4-7% prepared from E Sodium Silicate (PQ Corp.) | 3.2 | 99.9% | Greater than 2 weeks |
| 9 | 6% prepared from Lithium Silicate LSS35 (Nissan Chemical) | 3.4 | 95%-99.7% | Greater than 2 weeks |
| 10 | 5.6% prepared from Lithium Silicate LSS75 (Nissan Chemical) | 7.4 | N/A | Immediate |

Example 3

The samples in Example 3 were used to demonstrate the antimicrobial efficacy and silver reduction of antimicrobial articles comprising lithium silicate coatings. The coated articles were formed by dip coating a glass substrate with an aqueous solution prepared from lithium silicate LSS35 available from Nissan Chemical containing 6.0 wt. % total alkalisilicate. The lithium silicate had a molar ratio of SiO$_2$:alkali oxide of 3.4. The lithium silicate coatings were then cured at the temperatures as shown in Table 3 for a duration of 60 minutes. Subsequent to the curing, the articles underwent an antimicrobial treatment by immersion in a 50 wt. % AgNO$_3$/KNO$_3$ molten salt bath, antimicrobial medium for 5 to 6 minutes. The antimicrobial efficacy of the articles was measured using the EPA's "Test Method for Efficacy of Copper Alloy Surfaces as a Sanitizer." The silver reduction in Table 3 indicates a point in time when the Ag$^+$ ions were reduced to Ag$^0$ at one of ambient conditions, 50° C. at 50% relative humidity (50/50), or 85° C. at 85% relative humidity (85/85), as shown in Table 3 below. Reduced silver is measured using absorbance spectra, where nanoparticle Ag$^0$ shows a distinct peak at 420-430 nm, a plasmon resonance band which indicates the presence of reduced silver.

TABLE 3

| Sample No. | Curing temperature | Antimicrobial Efficacy | Silver Reduction |
|---|---|---|---|
| 11 | 300° C. | Greater than 99% | 3 days at ambient conditions |
| 12 | 430° C. | 97% | Greater than 1 week at 50/50 |
| 13 | 560° C. | 60% | Greater than 1 week at 50/50 |
| 14 | 600° C. | N/A | Greater than 1 week at 85/85 |

Example 4

The samples of Example 4 were used to demonstrate the antimicrobial efficacy and silver reduction of antimicrobial articles comprising sodium silicate coatings. The coated articles were formed by coating a glass substrate with an aqueous solution prepared from E sodium silicate available from PQ Corporation containing total alkalisilicate 3.4-7.0 wt. % The sodium silicate had a molar ratio of SiO$_2$:alkali oxide of 3.4. The antimicrobial coatings of Samples 15 and 16 comprised 5.3 wt. % SiO$_2$ and 1.7 wt. % alkali oxide, and the coating of Sample 17 comprised 2.6 wt. % SiO$_2$ and 0.8 wt. % alkali oxide. The sodium silicate coatings were then cured at the temperatures shown in Table 4 for a duration of 60 minutes. Subsequent to the curing, the articles underwent an antimicrobial treatment by dip coating in 50 wt. % AgNO$_3$/KNO$_3$ for 5 minutes. The antimicrobial efficacy of the articles was measured using the EPA's "Test Method for Efficacy of Copper Alloy Surfaces as a Sanitizer." The silver reduction in Table 4 indicates a point in time when the Ag$^+$ ions were reduced to Ag$^0$ at one of ambient conditions or at 60° C. and 90% relative humidity, as shown in Table 4 below. Reduced silver is measured using absorbance spectra, where nanoparticle Ag$^0$ shows a distinct peak at 420-430 nm, a plasmon resonance band which indicates the presence of reduced silver

TABLE 4

| Sample No. | Curing temperature | Antimicrobial Efficacy | Silver Reduction |
|---|---|---|---|
| 15 | 300° C. | Greater than 99% | 23° C. at 40% RH (Ambient) |
| 16 | 430° C. | Greater than 99% | 7 days at 60° C./90% RH |
| 17 | 430° C. | Greater than 90% | 7 days at 60° C./90% RH |

Example 5

The samples of Example 5 were used to demonstrate light absorbance versus wavelength of light for four samples with lithium silicate coatings. Concentrations and molar ratio of each of these are listed in Table 2. FIG. 1 graphically depicts the absorbance (y-axis) versus light wavelength (x-axis) for articles having the following lithium silicate coatings: lithium silicate prepared from LSS35 (Nissan Chemical), that was cured at 430° C. for 60 minutes, as depicted by x's in FIG. 1; lithium silicate prepared from LSS35 (Nissan Chemical), that was cured at 560° C. for 60 minutes, as depicted by triangles in FIG. 1; lithium silicate prepared from LSS75 (Nissan Chemical), that was cured at 430° C. for 60 minutes, as depicted by circles in FIG. 1; and lithium silicate prepared from LSS75 (Nissan Chemical), that was cured at 560° C. for 60 minutes, as depicted by squares in FIG. 1. Each of the above articles was subjected to an antimicrobial treatment by immersing in a molten salt bath 50 wt. % $AgNO_3/KNO_3$ for 5 minutes. As shown in FIG. 1 the absorbance of lithium silicate LSS75 cured at 430° C. showed a peak at 420-430 nm light wavelengths indicating the presence of the reduced nanoparticle $Ag^0$.

Example 6

The samples of Example 6 were used to demonstrate the effects of including boron-containing compounds in alkali silicate coatings. Glass substrates were coated from a 7.4 wt. % total alkali silicate solution prepared from sodium silicate available from Sigma Aldrich, which has a $SiO_2$:alkali oxide molar ratio of 2.5, mixed with boric acid having the molarity shown in Table 5 in equal volumes such that each concentration is halved. The coating was cured at the temperature shown in Table 5 for a duration of 60 minutes. Subsequent to curing, the articles were subjected to an antimicrobial treatment by dip coating the articles in 3 wt. % $AgNO_3/KNO_3$ for 5 to 6 minutes. The silver reduction in Table 5 indicated a point in time when the $Ag^+$ ions were reduced to $Ag^0$ at one of ambient conditions or at 50° C. and 50% relative humidity, as shown in Table 5 below.

TABLE 5

| Sample No. | Molarity of Boric Acid | Curing temperature | Silver Reduction |
|---|---|---|---|
| 18 | 0.22 | 560° C. | 3 days at ambient |
| 19 | 0.35 | 560° C. | Greater than 1 week at 50/50 |
| 20 | 0.22 | 430° C. | Greater than 1 week at 50/50 |
| 21 | 0.35 | 430° C. | Greater than 1 week at 50/50 |

Example 7

The samples of Example 7 were used to demonstrate light absorbance of lithium and sodium silicate coatings at various wavelengths of light. Glass substrates were dip coated in lithium or sodium silicate as shown in Table 6. After the glass substrates were coated, the coating was cured at 430° C. for 60 minutes. Subsequent to the curing, the articles were subjected to an antimicrobial treatment by immersing articles into a silver-containing antimicrobial medium having a composition as shown in Table 6 at 375° C. for 6 minutes.

TABLE 6

| Sample No. | Coating Composition | Antimicrobial Medium |
|---|---|---|
| 22 | 6% total alkalisilicate prepared from LSS35 (Nissan Chemical) | 50 wt. % $AgNO_3/KNO_3$ |
| 23 | 6% total alkalisilicate prepared from LSS35 (Nissan Chemical) | 50 wt. % $AgNO_3/NaNO_3$ |
| 24 | 7.4% total alkalisilicate prepared from Sodium Silicate (Sigma Aldrich) mixed with 0.22M boric acid in equal volumes | 50 wt. % $AgNO_3/NaNO_3$ |
| 25 | 7.4% total alkalisilicate prepared from Sodium Silicate (Sigma Aldrich) mixed with 0.22M boric acid in equal volumes | 50 wt. % $AgNO_3/NaNO_3$ |
| 26 | 7.4% total alkalisilicate prepared from Sodium Silicate (Sigma Aldrich) mixed with 0.35M boric acid in equal volumes | 50 wt. % $AgNO_3/KNO_3$ |
| 27 | 7.4% total alkalisilicate prepared from Sodium Silicate (Sigma Aldrich) mixed with 0.35M boric acid in equal volumes | 50 wt. % $AgNO_3/NaNO_3$ |

Figure 2A:
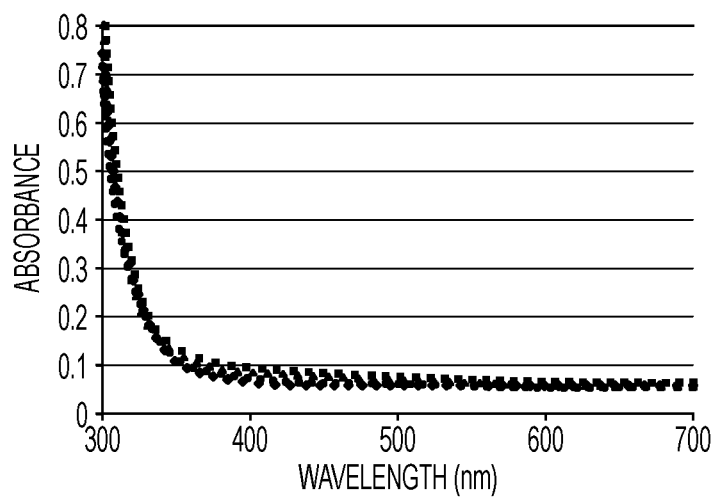
FIG. 2A is a graph showing light absorbance of articles having silver-containing alkali silicate coatings shortly after an antimicrobial treatment according to embodiments disclosed herein.

FIG. 2A shows the light absorbance (y-axis) versus wavelength (x-axis) for the articles of Sample 1 (indicated by circles in FIG. 2A), Sample 2 (indicated by triangles in FIG. 2A), Sample 4 (indicated by squares in FIG. 2A), and Sample 5 (indicated by x's in FIG. 2A) shortly after the antimicrobial treatment. Samples show greater than 85% transmission in the 400-800 nm and no evidence of reduced silver is seen from the absorbance spectra.

Figure 2B:
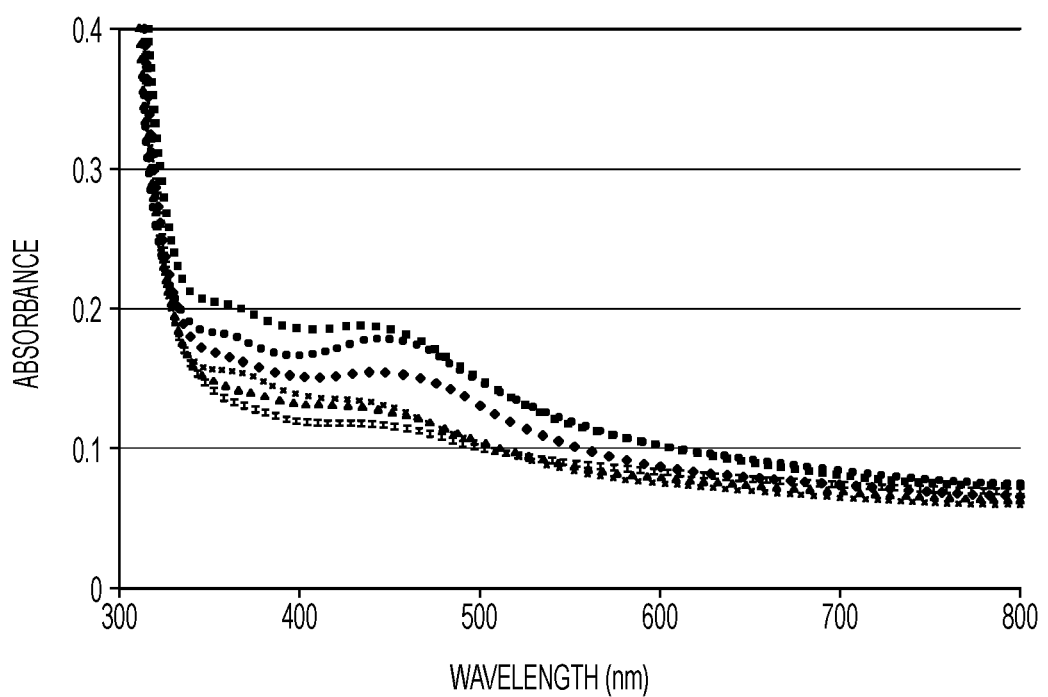
FIG. 2B is a graph showing light absorbance of articles having silver-containing alkali silicate coatings sixteen days after an antimicrobial treatment according to embodiments disclosed herein.

FIG. 2B shows the light absorbance (y-axis) versus wavelength (x-axis) for the articles of Sample 1 (indicated by circles in FIG. 2B), Sample 2 (indicated by triangles in FIG. 2B), Sample 3 (indicated by diamonds in FIG. 2B), Sample 4 (indicated by squares in FIG. 2B), Sample 5 (indicated by x's in FIG. 2B), and Sample 6 (indicated by ^ in FIG. 2B) after being exposed to conditions of 50° c. and 50% relative humidity for 16 days.

As can be seen in a comparison of FIG. 2A and FIG. 2B, the light absorbance only slightly increases at wavelengths between 420 nm and 430 nm after the articles have been exposed to 50° C. and 50% relative humidity for 16 days indicating the presence of reduced silver. The level of reduced silver is higher in some compositions.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for producing an antimicrobial article, the method comprising:

coating a substrate with a mixture comprising an alkali silicate;

curing the coating at a temperature from greater than or equal to about 300° C. to less than or equal to about 620° C. for a duration of greater than or equal to about 15 minutes to less than or equal to about 120 minutes; and contacting the coating with an antimicrobial medium comprising silver nitrate.

2. The method according to claim 1, wherein the antimicrobial medium has a temperature from greater than or equal to about 50° C. to less than or equal to about 490° C., and the coating is contacted with the antimicrobial medium for a duration greater than or equal to about 1.0 minute to less than or equal to about 360 minutes.

3. The method according to claim 1, wherein the antimicrobial medium is selected from the group consisting of an aqueous solution comprising saturated silver nitrate and a molten salt bath comprising silver nitrate and an alkali nitrate.

4. The method according to claim 1, wherein the substrate is strengthened prior to coating with the mixture comprising alkali silicate, and the curing is conducted at a temperature of less than or equal to 350° C. for a duration of less than or equal to 60 minutes.

5. The method according to claim 1, further comprising strengthening the substrate after it has been contacted with the antimicrobial medium by contacting the substrate with a strengthening medium comprising at least one alkali nitrate.

6. The method according to claim 1, wherein the mixture comprising an alkali silicate further comprises at least one of a boron-containing compound and an aluminum-containing compound.

* * * * *